United States Patent
Moroni

(10) Patent No.: US 6,494,337 B1
(45) Date of Patent: Dec. 17, 2002

(54) LID FOR PRESSURE COOKING RECEPTACLE

(75) Inventor: Donato Moroni, Pettenasco (IT)

(73) Assignee: Lagostino S.p.A., Verbania (IT)

( * ) Notice: Subject to any disclaimer, the term of this patent is extended or adjusted under 35 U.S.C. 154(b) by 0 days.

(21) Appl. No.: 09/869,248

(22) PCT Filed: Oct. 18, 2000

(86) PCT No.: PCT/EP00/10246

§ 371 (c)(1),
(2), (4) Date: Jun. 27, 2001

(87) PCT Pub. No.: WO01/30216

PCT Pub. Date: May 3, 2001

(30) Foreign Application Priority Data

Oct. 27, 1999 (IT) .......................................... MI99A2242

(51) Int. Cl.⁷ ............................................... B65D 45/24
(52) U.S. Cl. ......................... 220/314; 220/315; 220/324; 220/326; 292/258; 292/259 R
(58) Field of Search ................................. 220/314, 315, 220/316, 318, 323, 324, 326; 292/258, 259 R

(56) References Cited

U.S. PATENT DOCUMENTS

| 951,916 | A | * | 3/1910 | Leighty | 220/324 |
|---|---|---|---|---|---|
| 1,451,545 | A | * | 4/1923 | Ingersoll | 220/324 |
| 2,121,596 | A | * | 6/1938 | Hill | 220/326 |
| 2,599,072 | A | | 6/1952 | Schweiso | |
| 2,846,257 | A | * | 8/1958 | Sherrill | 220/324 |
| 3,049,328 | A | * | 8/1962 | Bishop | 292/259 R |
| 4,847,949 | A | | 7/1989 | Goad et al. | |
| 4,958,867 | A | * | 9/1990 | Champagne | 292/259 R |
| 5,678,721 | A | * | 10/1997 | Cartigny et al. | 220/316 |
| 6,053,347 | A | * | 4/2000 | Fullin | 220/326 |
| 6,257,124 | B1 | * | 7/2001 | Chen | 220/314 |

FOREIGN PATENT DOCUMENTS

| CH | 148637 | 7/1931 |
|---|---|---|
| CH | 184844 | 6/1936 |
| EP | 0 722 689 A1 | 7/1996 |

* cited by examiner

Primary Examiner—Nathan J. Newhouse
(74) Attorney, Agent, or Firm—Young & Thompson

(57) ABSTRACT

A lid for a pressure cooking receptacle supporting a jaws device for closure/opening of the receptacle, a device for controlling opening/closure of the receptacle and a safety device for blocking closure of the receptacle. The closure/opening device comprises a first radially retractable jaw for securing the lid to the receptacle and extensible for releasing the lid from the receptacle and at least one second jaw integral with the lid. The control device comprises a radial arm for moving the mobile jaw, attached to the mobile jaw at its radially external end, and a lever which can be actuated manually, fitted with elements which can be engaged with the radial arm for controlling the stroke of the radial arm.

19 Claims, 5 Drawing Sheets

LID FOR PRESSURE COOKING RECEPTACLE

The present invention relates to a lid for a pressure cooking receptacle.

The traditional pressure cooking receptacle of interest for the present invention is that wherein closure of the receptacle is accomplished by a jaws system.

This traditional blocking system is formed by at least two jaws radially mobile on the lid between a retracted position of closure of the receptacle and an extended position of opening of the receptacle.

In particular the edge of the mouth of the cooking receptacle is bent outwards in order to be secured by the jaws and ensure pressure tightness.

An undoubted advantage of such a blocking system, particularly compared to the bayonet blocking system, consists in the fact that, thanks to the configuration of the edge of the mouth, the receptacle can also be used merely as a pan or saucepan for cooking foods at atmospheric pressure.

Other advantages of the jaws blocking system, compared again to the bayonet blocking system, consist in its versatility of operation due to the fact that it allows engaging of the lid on the receptacle irrespective of the relative angular position between the one and the other, and due to the fact that it can also be attached to non-circular, for example oval, lids and hence without restraints as regards the shape of the cooking receptacle.

Contrarily a traditional jaws blocking system has a complex structure due to the need to control the movement of closure and opening of the jaws alternatively.

In this respect in fact the jaws are attached to a respective mobile control arm, and the mobile arms must have interconnection parts such as to perform synchronised actuation of the jaws in the operation of opening and closure of the receptacle.

In some traditionally known solutions separate mechanisms are dedicated to the opening and to the closure of the jaws.

In others, for opening of the receptacle, a push-button is used on the lid which is capable of moving the arms of the jaws radially outwards and special elastic return parts are inserted between the arms of the jaws which are loaded during extension of the jaws so as to return the same subsequently into the initial retracted position.

One object of the present invention is that of remedying the disadvantages suffered by a traditional lid of a pressure cooking receptacle fitted with a jaws closure/opening system.

In particular one object of the present invention is that of providing a lid for a pressure cooking receptacle with a simplified structure and mode of operation for the closure of the cooking receptacle.

Another object of the present invention is that of providing a lid for a pressure cooking receptacle formed by a minimum number of parts which is therefore also less expensive.

The present invention achieves these objects by providing a lid for a pressure cooking receptacle supporting a jaws device for closure/opening of the receptacle, a device for controlling opening/closure of the receptacle and a safety device for blocking closure of the receptacle, characterised in that said closure/opening device comprises a first radially retractable jaw for securing the lid to the receptacle and extensible for release of the lid from the receptacle and at least one second jaw integral with the lid, and in that said control device comprises a radial arm for moving the mobile jaw, attached to the mobile jaw at its radially external end, and a lever which can be actuated manually, fitted with means which can be engaged with said radial arm for controlling the stroke of said radial arm.

The presence of a single mobile jaw allows a considerable reduction in the number of parts forming the mechanism of movement of the system for closure of the receptacle, while the lever control allows the mobile jaw to be actuated during opening and closure simply by reversing the direction of rotation of the lever.

The use of a lever control system also eliminates the need to use return parts for retracting the jaws, whose intactness would moreover guarantee the correct closure of the receptacle.

The other jaw, or possibly other jaws, being integral with the edge of the lid, can easily be designed with a wide angular opening as required, thus contributing to a more even distribution of the stresses, caused by the pressure which is generated inside the receptacle, on the mouth edge of the receptacle itself and on the external edge of the lid.

The safety device for blocking closure of the lid finally is advantageously suitable for a number of alternative solutions, all aimed at blocking the control lever when the receptacle reaches a preset pressure.

These and other advantages will be made clearer on reading some preferred embodiments of the invention which refer to the accompanying drawings in which.

Figure 1:
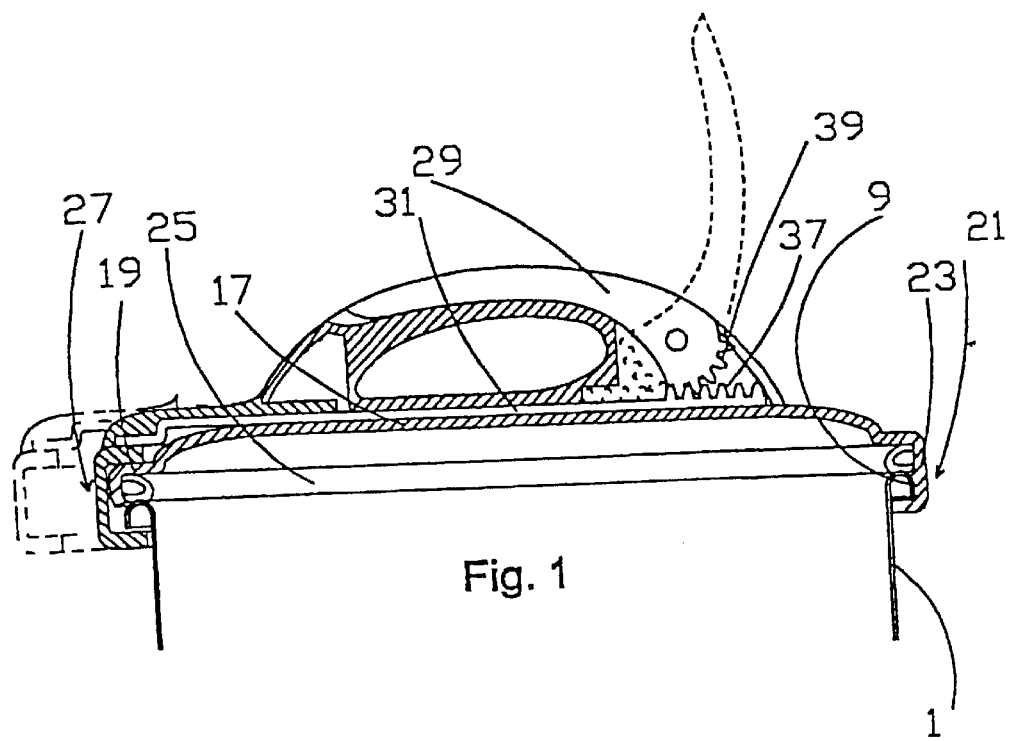
FIG. 1 shows a simplified sectioned view in lateral elevation of the lid of the present invention in accordance with a first embodiment of the safety system, wherein the configuration corresponding to opening of the receptacle is shown by a dotted line.
Figure 2:
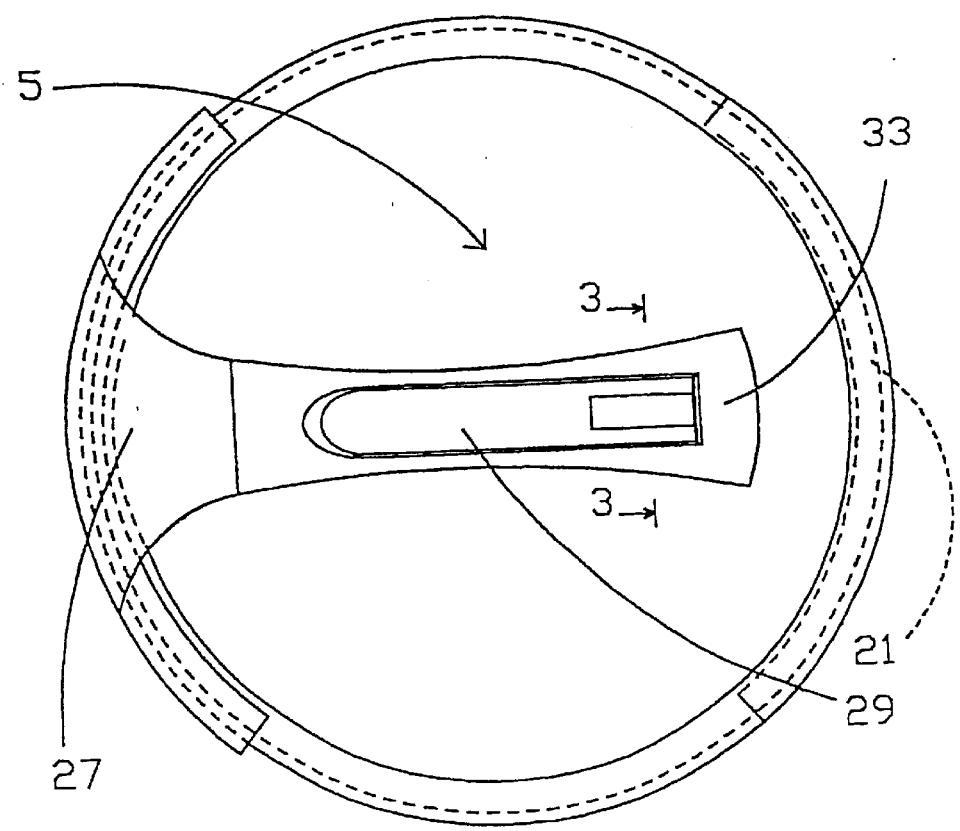
FIG. 2 shows a plan view of the lid of FIG. 1.
Figure 3:
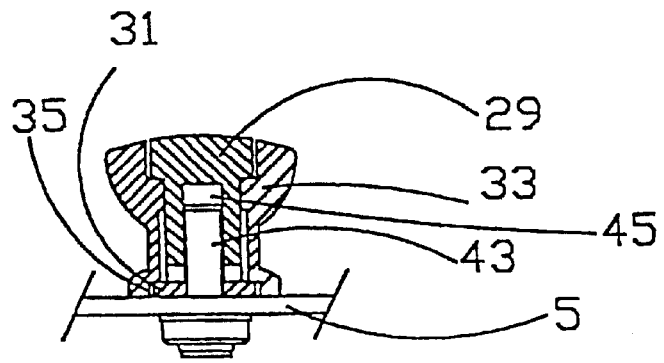
FIG. 3 shows an enlargement of the view sectioned along line 3—3 of FIG. 2.
Figure 4:
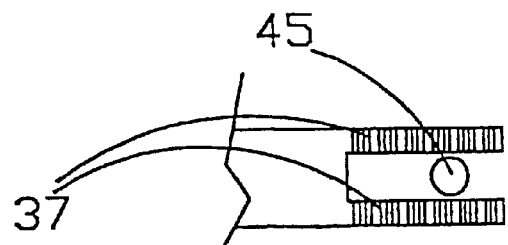
FIG. 4 shows a sectioned enlargement of a detail of the safety device of the lid of FIGS. 1–3.

In FIGS. 1–11 the pressure cooking device comprises a cooking receptacle 1, 1', 1" and a lid 5, 5', 5" which can be attached for closure of the receptacle 1, 1', 1".

The receptacle 1, 1', 1" is composed of a circular base (not illustrated) and a side wall whose upper edge 9, 9', 9" is bent outwards through 180°.

The lid 5, 5', 5" comprises an upper wall formed by a curved central portion 17,17',17" and by a flat annular peripheral portion 19, 19', 19" and a side wall which extends at right angles downwards from the external edge of the annular peripheral portion 19, 19', 19" of the upper wall of the lid 5, 5', 5".

A segment 23, 23', 23" of the side wall of the lid 5, 5', 5" extends axially and has its lower edge bent at right angles towards the interior of the lid in such a way as to form, in association with the overlying flat annular peripheral portion 19, 19', 19" of the upper wall of the lid 5, 5', 5", a fixed jaw 21, 21', 21" with a recumbent U profile for securing the bent edge 9, 9', 9" of the receptacle 1, 1', 1".

On the internal side of the flat annular peripheral portion 19, 19', 19" of the upper wall of the lid there is an annular seal 25, 25', 25".

Figure 9:
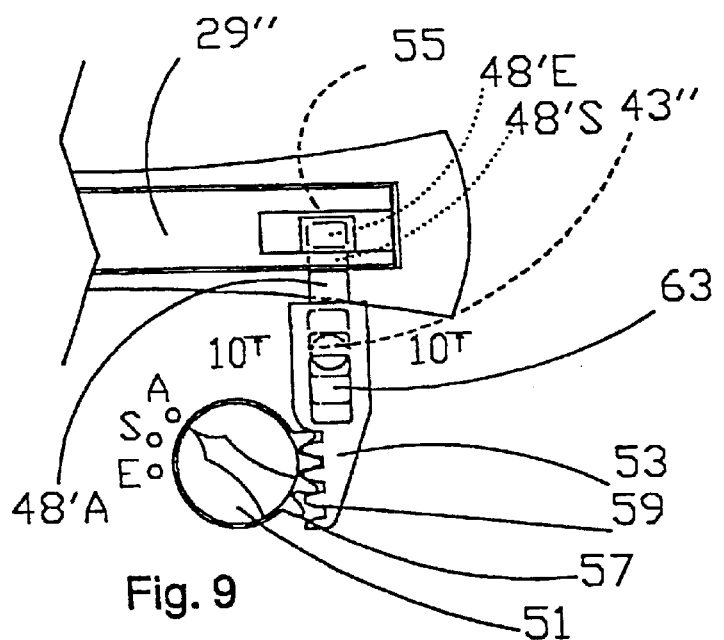
FIG. 9 shows an enlarged plan view of the safety system of the lid of FIG. 8.
Figures 10, 11:
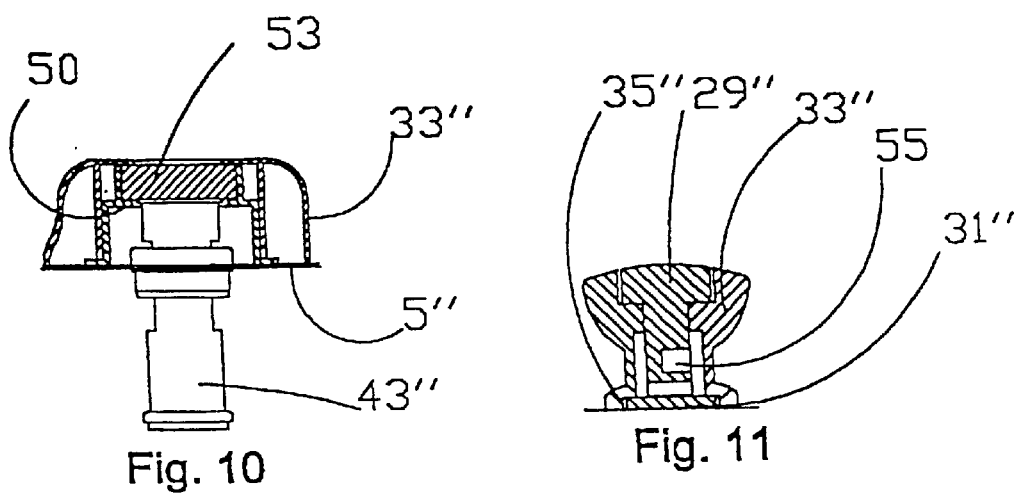
FIG. 10 shows an enlarged view of a lid section taken along line 10—10 of FIG. 9.
FIG. 11 shows an enlarged view of a lid section taken along line 11—11 of FIG. 8.
Figure 12:
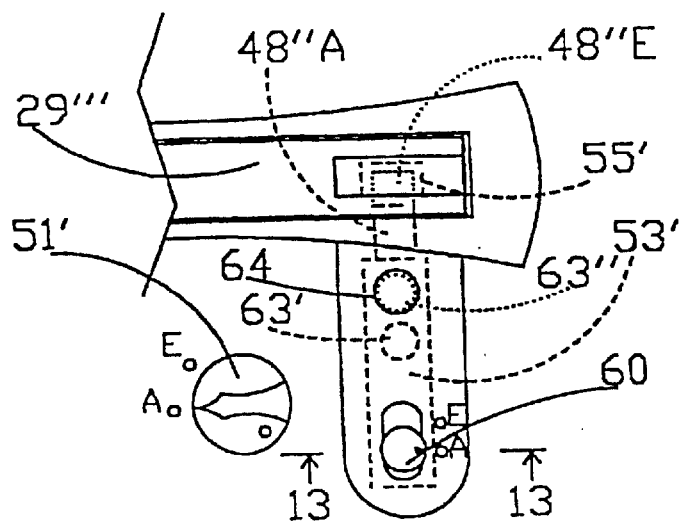
FIG. 12 shows a plan view of a fourth embodiment of the safety system attached to the lid of the present invention.

On the lid 5, 5', 5", in addition to the safety and working valves, the latter illustrated only in FIGS. 9 and 12, a jaw 27, 27', 27" is attached and controlled by a lever 29, 29', 29" via a radial arm 31, 31', 31" to move radially on a diameter of the lid 5, 5', 5".

The mobile jaw 27, 27', 27" has a recumbent U profile and an angular opening equal to that of the fixed jaw 21, 21', 21" in relation whereto it is then positioned in the diametrically opposed point of the lid 5, 5', 5".

According to a possible variant, the angular opening of the fixed jaw 21, 21', 21" can extend at most up to 180° and form a total angle of 360° with the mobile jaw 27, 27', 27", thus enabling the stresses caused by the pressure generated in the receptacle 1, 1', 1" to be distributed along the whole of the flat annular portion 19, 19', 19" of the upper wall of the lid 5, 5', 5" and along the whole bent edge 9, 9', 9" of the receptacle 1, 1', 1".

It is equally possible to foresee fractioning of the fixed jaw into a series of smaller jaws distributed peripherally on the lid 5, 5', 5".

It is also possible for the fixed jaw 21, 21', 21" to be made separately from the body of the lid 5, 5', 5" and then be attached thereto for example by welding or riveting.

The lever 29, 29', 29" is supported rotatingly around a horizontal axis by a fillet 33, 33', 33" attached onto the central portion 17, 17', 17" of the upper wall of the lid 5, 5', 5" while the radial arm 31, 31', 31" has the radially external end attached, for example welded, to the mobile jaw 27, 27', 27" and is capable of sliding radially within a fixed linear guide 35, 35', 35" formed in the body of the fillet 33, 33', 33".

Between the radially internal end of the radial arm 31, 31', 31" and the lever 29, 29', 29" means are provided which can be reciprocally engaged to perform the transmission and transformation of the rotary control movement of the lever 29, 29', 29" into the radial translating movement of the jaw 27, 27', 27".

These means comprise a rack profile 37 and 37, 37', 37" formed on the upper side of the arm 31, 31', 31" and meshing with a cogged wheel arch profile 39 and 39, 39', 39" formed at the end of the lever 29, 29', 29" adjacent to the lid 5, 5', 5".

Figure 14:
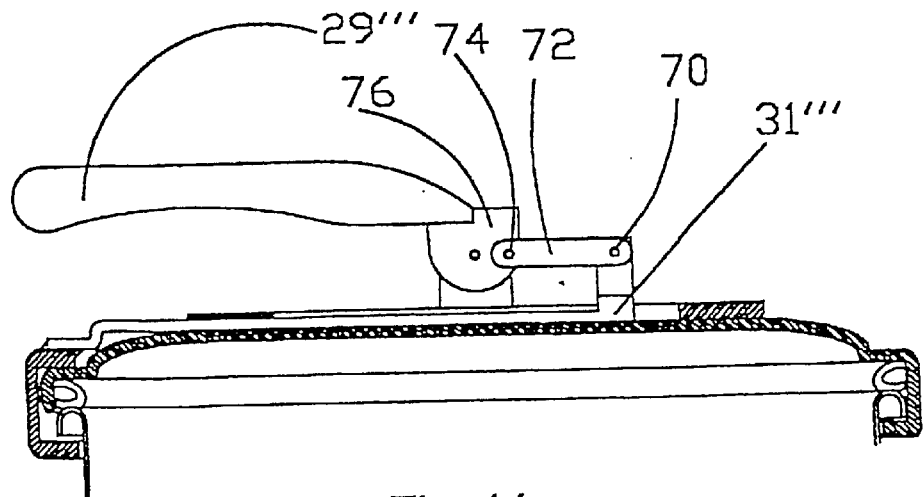
FIG. 14 shows a lateral elevation view, partially sectioned, of another embodiment of the means for engaging the lever and the arm of the mobile jaw for a lid in accordance with the present invention.

In FIG. 14 an alternative embodiment of these engaging means foresees the connection between the lever 29'" and the arm 31'" of the mobile jaw by means of a connecting rod 72.

The connecting rod 72 has an end 70 rotatingly hinged to the raised end of the arm 31'" opposite the mobile jaw, and the other end 74 rotatingly hinged on the flange 76 for attachment of the lever 29'" to the lid in an eccentric point in relation to the point of rotation of the lever 29'".

Those illustrated are only two of the various possible ways of forming the engagement between the lever and the arm of the mobile jaw of a lid in accordance with the present invention.

Functioning of the device for controlling closure/opening of the receptacle is 5 the following: the lid 5, 5', 5" is first attached to the receptacle 1, 1', 1" with the vertical lever 29, 29', 29" corresponding to the position of the mobile jaw 27, 27', 27" far from the bent edge 9, 9', 9".

In this way it is possible to engage the fixed jaw 21, 21', 21" on the bent edge 9, 9', 9" of the receptacle 1, 1', 1" in such a way that the seal 25, 25', 25" placed between the edge 9, 9', 9" of the receptacle 1, 1', 1" and the flat annular portion 19, 19', 19" of the lid 5, 5', 5" is capable of creating the pressure tightness.

At this point the lever 29, 29', 29" is actuated manually and whose movement rotates the cogged wheel arch profile 39 and 39, 39', 39" meshed on the rack profile 37 and 37, 37', 37" of the arm 31, 31', 31" with the arm 31, 31', 31" which in turn returns the mobile jaw 27, 27', 27" until it engages on the bent edge 9, 9', 9" of the receptacle 1, 1', 1", which ends when the lever 29, 29', 29" has rotated through 90° approximately, taking up a horizontal position.

The structure of the lever control system of the single mobile jaw is extremely simplified and allows the installation on the lid of various safety systems for blocking closure of the lid, advantageously obtained by preventing rotation of the lever when the recipient 1, 1', 1" reaches a preset pressure.

FIGS. 1–4 show an example of a first embodiment of the safety system wherein a blocking member is provided in the form of an axially extended pin 43 which is capable of performing a vertical stroke through a hole 45 formed in the lid 5 between an upper point reached at a preset pressure and a lower point occupied at atmospheric pressure.

The means of engaging the lever 29 and the arm 31 in this case are in fact formed by a double rack profile 37, 37 meshing with a corresponding double cogged wheel double arch profile 39, 39 so that, with the lid 5 closed, when the pressure rises inside the receptacle 1, the pin 43 can rise in the free space between the two rack profiles 37, 37 up to the upper point of its stroke and insert in a housing 45 formed especially between the two cogged wheel arch profiles 39, 39 blocking rotation of the lever 29.

Figure 7:
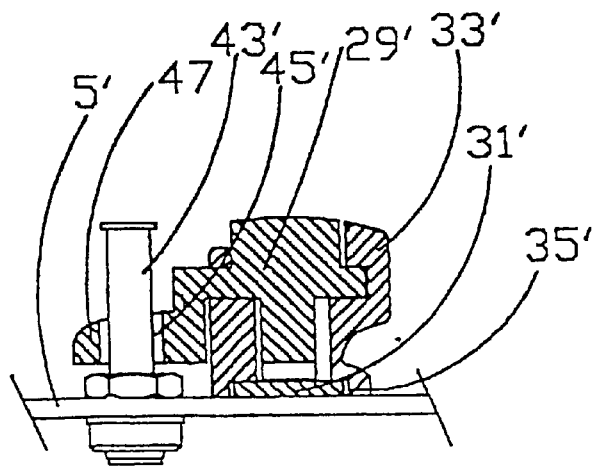
FIG. 7 shows an enlargement of the view along section 7—7 of FIG. 6.
Figure 5:
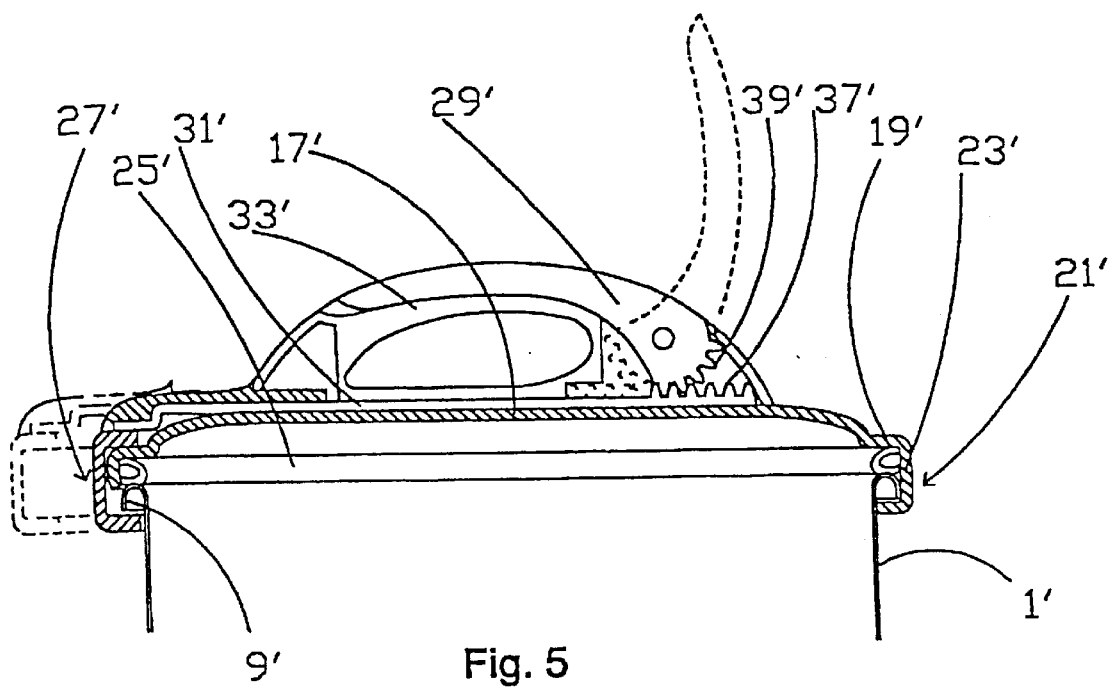
FIG. 5 shows a simplified sectioned view in elevation of the lid of the present invention in accordance with a second embodiment of the safety system, wherein the configuration corresponding to opening of the receptacle is shown by a dotted line.
Figure 6:
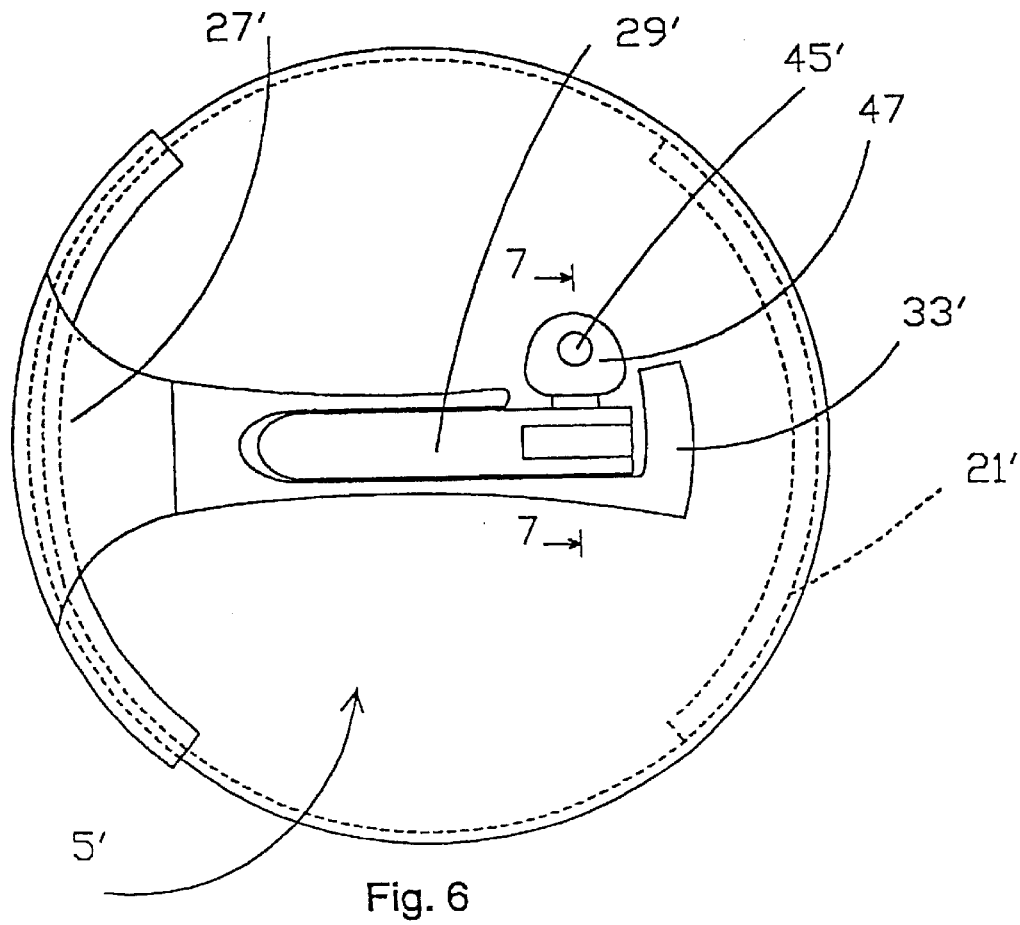
FIG. 6 shows a plan view of FIG. 5.
Figure 8:
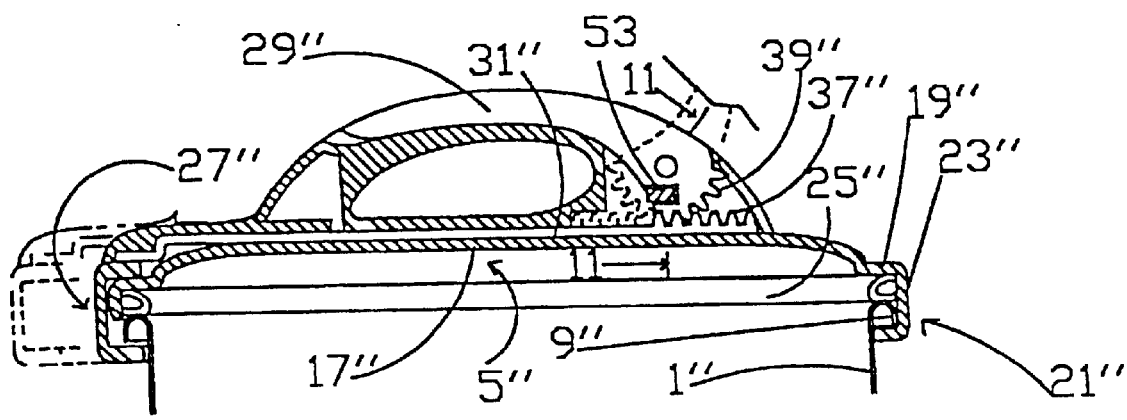
FIG. 8 shows a simplified sectioned view in elevation of the lid of the present invention in accordance with a third embodiment of the safety system, wherein the configuration corresponding to opening of the receptacle is shown by a dotted line.

FIGS. 5–7 give an example of a second embodiment of the safety system wherein, unlike the previous case, the engagement housing 45' of the pin 43' is formed on a side extension 47 of the control lever.

In this embodiment a single rack profile is moreover provided on the radial arm and a single cogged wheel arch profile on the lever.

Figure 13:
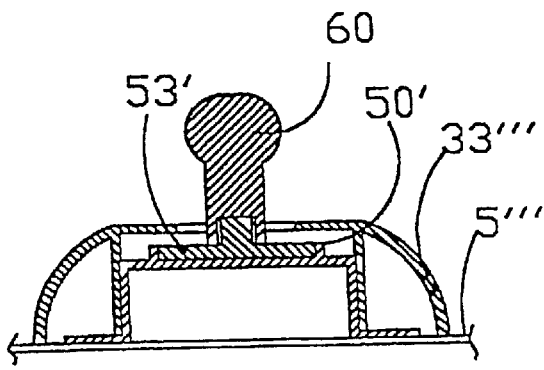
FIG. 13 shows an enlarged view of a lid section taken along line 13—13 of FIG. 12.

FIGS. 8–11 give an example of a third embodiment of the safety system wherein the blocking member is actuated via the working valve 51, while in FIGS. 12 and 13 a fourth embodiment foresees a safety system which can be actuated by hand.

The blocking member is now a small jack 53, 53' inserted in a fixed horizontal linear guide 50, 50' formed on the fillet 33", 33'" of the lid 5", 5'".

The end 48'A, 48"A of the jack 53, 53' on the side of the lever 29", 29'" has a suitable shape for engaging in a corresponding recess 55, 55' formed on the side surface of the lever 29", 29'" when the latter 29", 29'" is in a closure position.

In the embodiment of FIGS. 8–11, the jack 53 has means which can be engaged with the working valve 51 to transform manual rotation of the working valve 51 into horizontal translation of the jack 53 until engaging in the recess 55 of the lever.

In particular these means can be made from a cogged wheel arch profile 57 formed on the periphery of the working valve 51 meshing with a rack profile 59 formed on the side of the jack 53.

In the embodiment of FIGS. 12 and 13 however the working valve 51' is totally separate from the jack 53' and the latter is actuated manually by means of a knob 60 integral thereto.

In both embodiments, in order to restrain the jack 53, 53' in the position of blocking of the lever 29", 29'", the safety system has a pin which is vertically mobile through the lid and capable of inserting in a housing of the jack 53, 53' to prevent its translation.

In the embodiment of FIGS. 8–11 the housing on the jack 53 is formed by an elongated hole 63 which remains above the pin 43" both when the working valve 51 moves into the position indicated by "E", which represents the working condition of functioning of the device, and when the working valve moves into the position indicated by "S", which represents the discharge condition of the device. In these two positions the pin 43" occupies the elongated hole 63 of the jack 53 to ensure blocking of the lever 29", while the end 48'S, 48'E of the jack 53, represented in FIG. 9 by dotted lines, is engaged in the recess 55 of the lever 29", blocking rotation of the same lever 29".

When the working valve 51 moves into the position indicated by "A" which represents the opening condition of the device, as in the case illustrated in FIG. 9, the pin 43" is off-centre in relation to the elongated hole 63 and cannot penetrate it, while the end 48'A of the jack 53 is extracted from the recess 55 in such a way as to allow rotation of the lever 29".

Similarly, in the embodiment of FIGS. 12 and 13, with the knob 60 in position "E", the end 48"E of the jack 53' (represented by a dotted line) is engaged in the recess 55' of the lever 29'" while the pin (not illustrated), vertically aligned with a hole 64 in the fillet 33'", is off-centre in relation to the housing of the jack 63'. With the knob 60 in position "A" however, the end 48"A of the jack 53' is extracted from the recess 55' of the lever 29'" while the pin is aligned with the relative housing on the jack 63". The release signal for discharge of the steam inside the cooker in this case is provided simply by manually raising the working valve, for example of the spring type.

It is understood that a number of variations and changes are foreseeable and that the preferred embodiments illustrated above must be read purely by way of a non-limiting example of the more general solution idea proposed by the present invention.

What is claimed is:

1. A lid for a pressure cooking receptacle supporting a jaws device for closure/opening of the receptacle, a device for controlling opening/closure of the receptacle, and a safety device for blocking closure of the receptacle, characterized in that said closure/opening device comprises a first radially retractable jaw for securing the lid to the receptacle and extensible for releasing the lid from the receptacle and at least one second fixed jaw integral with the lid, and in that said control device comprises a radial arm for moving the mobile jaw, attached to the mobile jaw at its radially external end, a rotating lever which can be actuated manually, and means for engagement between said lever and said radial arm in order to transform the rotation of the lever into radial translation of the mobile jaw.

2. A lid for a pressure cooking receptacle according to claim 1, characterized in that said engaging means between the lever and the arm of the mobile jaw comprise a connecting rod for connection between the lever and the arm of the mobile jaw, said connecting rod having one end rotatingly hinged to the arm, and the other end rotatingly hinged on a part of the lever for attachment to the lid in an eccentric point in relation to the point of rotation of the lever.

3. A lid for a pressure cooking receptacle according to claim 2, characterized in that a linear guide is provided, attached to the lid for the radial sliding of the arm of the mobile jaw.

4. A lid for a pressure cooking receptacle according to claim 1, characterized in that said engaging means comprise a cogged wheel arch profile, or profiles, formed on the surface of the lever meshing with a rack profile, or profiles formed on the surface of the radial arm.

5. A lid for a pressure cooking receptacle according to claim 4, characterized in that said lever is hinged on the lid rotatingly around a horizontal axis, and in that said cogged wheel arch profile is formed at the end of the lever adjacent to the lid, and said rack profile is formed on the upper side of the radial arm.

6. A lid for a pressure receptacle according to claim 1, characterized in that said fixed jaw is formed directly from the edge of the lid.

7. A lid for a pressure receptacle according to claim 1, characterized in that said fixed jaw is attached to the edge of the lid.

8. A lid for a pressure cooking receptacle according to claim 1, characterized in that the closure/opening device comprises said mobile jaw and said fixed jaw arranged at the ends of a diameter of the lid.

9. A lid for a pressure cooking receptacle according to claim 1, characterized in that the opening/closure device comprises said fixed jaw and said mobile jaw having an angular opening up to 180°.

10. A lid for a pressure cooking receptacle according to claim 1, characterized in that the opening/closure device comprises said mobile jaw and a series of fixed jaws distributed on the edge of the lid.

11. A lid for a pressure cooking receptacle according to claim 1, characterized in that the safety system for blocking closure of the receptacle comprises a member for blocking the lever and an engagement housing for said blocking member formed on the lever or on a body integral therewith.

12. A lid for a pressure cooking receptacle according to claim 11, characterized in that said member for blocking the lever is an axial pin provided vertically mobile through the lid, and in that said housing for engagement of the blocking member in position of closure of the lever is vertically aligned with the pin in such a way that said pin, actuated by the pressure inside the receptacle, is engaged in said housing.

13. A lid for a pressure cooking receptacle according to claim 11, characterized in that a fixed linear guide is provided on the lid for guiding the horizontal sliding of the blocking member.

14. A lid for a pressure cooking receptacle according to claim 11, characterized in that said blocking member is supported, horizontally mobile, above the lid, and in that means are provided for actuation of said blocking member.

15. A lid for a pressure cooking receptacle according to claim 14, characterized in that said means for actuating the blocking member are in the form of a knob integral with the blocking member which can be actuated by hand.

16. A lid for a pressure cooking receptacle according to claim 14, wherein a working valve is provided, characterized in that said means for actuation of said blocking member are means which can be reciprocally engaged between said blocking member and the working valve.

17. A lid for a pressure cooking receptacle according to claim 16, characterized in that said means which can be reciprocally engaged between said blocking member and the working valve are in the form of a cogged wheel arch profile formed on the periphery of the working valve meshing with a rack profile formed on the side of said blocking member turned towards said working valve in such a way as to transform manual rotation of the working valve into horizontal translation of the blocking member until engaging in the corresponding housing.

18. A lid for a pressure cooking receptacle according to claim 14, characterized in that means are provided for restraining said blocking member in the blocking position.

19. A lid for a pressure cooking receptacle according to claim 18, characterized in that said means for restraining said blocking member in the blocking position comprise an axial pin vertically mobile through the lid, and a housing for the pin formed on said blocking member, said housing on the blocking member being mobile between a position vertically aligned with said pin, at the position of engaging of the blocking member in its engagement housing on the lever, for holding said pin, pushed by the pressure which is generated in the receptacle in such a way as to block closure of the receptacle, and an off-centre position of the pin, at the position of extraction of the blocking member from its engagement housing on the lever, to stop the rise of the pin pushed by the pressure which is generated in the receptacle in such a way as to avoid sealed closure of the receptacle.

* * * * *